US006149222A

United States Patent [19]

Schambre et al.

[11] Patent Number: 6,149,222

[45] Date of Patent: Nov. 21, 2000

[54] HINGE ASSEMBLY FOR A VEHICLE DOOR

[75] Inventors: John Schambre; David L. Garber, both of Canton; Paul A. Lowis, Pontiac; Michael O. Forker, Novi; L. Guy M. Montford, Canton; Raymond C. Deyonker, Wixom; Joseph P. Holland, Farmington Hills, all of Mich.

[73] Assignee: DaimlerChrysler Corporation, Auburn Hills, Mich.

[21] Appl. No.: 09/346,217

[22] Filed: Jul. 1, 1999

[51] Int. Cl.[7] ........................ B60J 5/04

[52] U.S. Cl. ........................ 296/146.12; 296/146.11; 16/366; 16/334

[58] Field of Search ........................ 296/146.11, 146.12, 296/202; 16/366, 319, 334, 367

[56] References Cited

U.S. PATENT DOCUMENTS

| | | | |
|---|---|---|---|
| 3,016,261 | 1/1962 | Tatter | 296/46 |
| 3,074,755 | 1/1963 | Peras | 296/44 |
| 3,150,408 | 9/1964 | Belsky | 16/163 |
| 3,594,853 | 7/1971 | Slattery | 16/163 |
| 3,848,293 | 11/1974 | Marchione et al. | 16/163 |
| 4,266,321 | 5/1981 | Pelchat et al. | 16/145 |
| 4,495,674 | 1/1985 | Haddock, Jr. | 16/302 |
| 4,632,447 | 12/1986 | Nomura et al. | 296/153 |
| 4,641,881 | 2/1987 | Nomura et al. | 296/202 |
| 4,650,241 | 3/1987 | Motonami et al. | 296/187 |
| 4,658,475 | 4/1987 | Kinaga et al. | 16/367 |
| 4,665,587 | 5/1987 | Kinaga et al. | 16/370 |
| 4,665,596 | 5/1987 | Green | 24/662 |
| 4,700,983 | 10/1987 | Kinaga et al. | 296/146 |
| 4,700,984 | 10/1987 | Kinaga et al. | 296/146 |
| 4,713,862 | 12/1987 | Kinaga et al. | 16/223 |
| 4,716,623 | 1/1988 | Kinaga et al. | 16/371 |
| 4,719,665 | 1/1988 | Bell | 16/232 |
| 4,738,003 | 4/1988 | Mori et al. | 16/321 |

*Primary Examiner*—Joseph D. Pape
*Attorney, Agent, or Firm*—Marc Lorelli

[57] ABSTRACT

A hinge assembly for a motor vehicle having an upper joint, a middle joint and a lower joint. The upper joint pivotally interconnects a door to a body. The middle joint pivotally interconnects the door to a rod. A door axis of rotation is defined by the upper and middle joints. A lower joint pivotally interconnects the body to the rod. A control linkage pivotally interconnects the door and the body defining a conical path for the door axis of rotation to follow.

27 Claims, 8 Drawing Sheets

HINGE ASSEMBLY FOR A VEHICLE DOOR

BACKGROUND OF THE INVENTION

1. Technical Field

The present invention generally pertains to motor vehicles. More particularly, the present invention pertains to a hinge assembly for a vehicle door. More specifically, but without restriction to the particular embodiment and/or use which is shown and described for purposes of illustration, the present invention relates to a hinge assembly for a vehicle door which creates a conically shaped path for the door axis of rotation to follow. As the vehicle door is opened, the door axis of rotation shifts away from the vehicle.

2. Discussion

The passenger doors of motor vehicles are typically installed with conventional hinge assemblies that permit pivotal movement of the door between an open position and a closed position. The conventional hinge assemblies function to interconnect the passenger door and a body of the vehicle. Typically, motor vehicle doors pivot relative to the vehicle body about a fixed axis of rotation. While conventional doors have functioned adequately in the past, doors pivoting about fixed axes of rotation impose significant design limitations.

Most conventional doors of motor vehicles include hinges positioned as close to the forward edge of the door as possible. Because it is impractical to mount a hinge at the very edge of the door, there is a portion of the door located between the forward edge of the door and the hinge that must necessarily rotate inwardly toward the vehicle as the door is being opened. Accordingly, vehicle doors and other components which are positioned near the forward edge of the door are designed to provide clearance for the inwardly swinging portion of the door previously described. As such, vehicle designers have often been forced to compromise styling and aesthetic appearance in order to provide operating clearances for the door and exterior body cladding located on the door.

Conventional hinge assemblies also have limited opportunities to improve ingress and egress of occupants. As a door with a conventional hinge is opened, the forward edge of the door rotates toward the passenger compartment. The forward edge intrusion limits the total number of degrees the door may rotate from a closed position to a fully opened position. Design concerns relating to vehicle stiffness and impact resistance often limit the amount of space that may be dedicated for door clearance. Accordingly, vehicle door swings of up to 90 degrees are generally not available.

SUMMARY OF THE INVENTION

It is a general object of the present invention to provide a truly unique and versatile hinge assembly for a vehicle door.

It is another object of the present invention to provide a hinge assembly for a vehicle door that enables a forward edge of the door to swing farther away from the vehicle during door opening, thereby increasing styling opportunities to enhance cladding and door cut lines, improving ingress and egress of occupants, and providing greater access for loading packages into and out of the vehicle.

It is a more particular object of the present invention to provide a door axis of rotation that follows a conically shaped path as the door is articulated. Specifically, the distance between the door axis of rotation and the vehicle body increases as the door is rotated from a closed position to an opened position.

In one form, the present invention provides a hinge assembly for a motor vehicle having a body and a frame. The hinge assembly includes an upper joint pivotally interconnecting a door to the body. The hinge assembly additionally includes a middle joirt pivotally interconnecting the door to a rod, the upper and middle joints defining a door axis of rotation. The hinge assembly further includes a lower joint interconnecting the body to the rod.

In another form, the present invention provides an upper hinge having a first door clasp coupled to a door and a first body clasp coupled to the vehicle body. The first door clasp and first body clasp are pivotally interconnected by a first universal joint. The hinge assembly also includes a lower hinge having a second door clasp coupled to the door and a second body clasp rotatably coupled to the body by a ball and socket joint. The second door clasp and second body clasp are pivotally interconnected by a second universal joint. A control linkage pivotally interconnects the door and the body.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENTS

Figure 1:
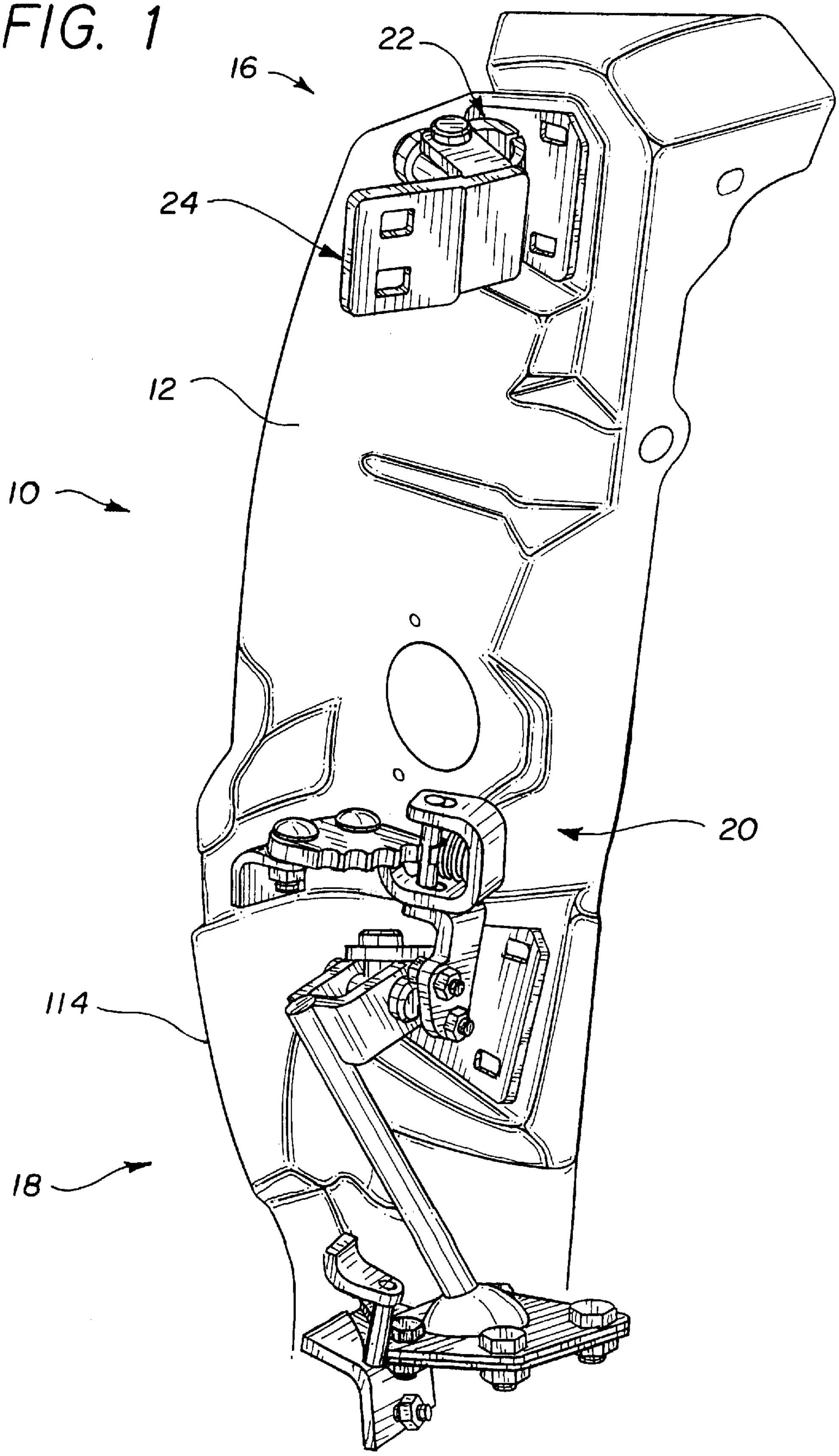
FIG. 1 is a perspective view of a hinge assembly constructed in accordance with the teachings of a first embodiment of the present invention, the hinge assembly shown operatively associated with a door and body of a motor vehicle.

With initial reference to FIGS. 1 through 7, a hinge assembly constructed in accordance with the teachings of the first embodiment of the present invention is generally identified at reference numeral 10. The hinge assembly is shown operatively associated with a door 12 and a body 14 of a motor vehicle (not shown in detail). In the particular application illustrated, hinge assembly 10 includes an upper hinge 16, a lower hinge 18 and a control linkage 20.

Figure 2:
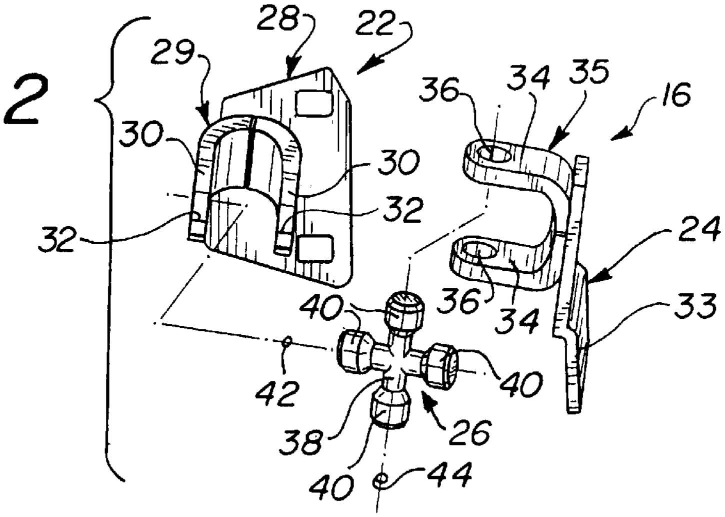
FIG. 2 is an exploded view of the upper hinge portion of the hinge assembly of the first preferred embodiment of the present invention.

As shown in FIG. 2, upper hinge 16 includes a first portion 22, a second portion 24 and a connection member 26. First portion 22 is illustrated to include a generally planar mounting plate 28 and a first hinge element 29. The first hinge element 29 is welded or otherwise securely attached to the mounting plate 28 and is generally U-shaped having two generally parallel legs 30. Each leg 30 includes a bearing aperture 32 axially aligned with the other. Similarly, second portion 24 includes a generally planar mounting plate 33 and a second hinge element 35 welded or otherwise suitably attached thereto. Again, the second hinge element 35 is generally U-shaped having two parallel legs 34 each having a bearing aperture 36 located therein.

Connection member 26 includes a cross-shaped portion 38 defining a pair of orthogonal axes 42 and 44, bearing caps 40, and needle bearings (not shown). One skilled in the art will appreciate that connection member 26 cooperates with first and second hinge elements 29 and 35 to define what is commonly referred to as a universal joint. Connection member 26 includes needle bearings positioned between each of bearing caps 40 and cross-shaped portion 38 to provide a rotational degree of freedom therebetween.

Referring to FIGS. 1 and 2, connection member 26 couples first portion 22 and second portion 24 in a manner such that first portion 22 is free to rotate about axis 42 and second portion 24 is free to rotate about axis 44. In addition, first portion 22 is coupled to door 12 in any manner well known in the art, such as bolting, riveting or welding. To complete the interconnection of door 12 with body 14, second portion 24 is similarly coupled to the body 14.

Figure 3:
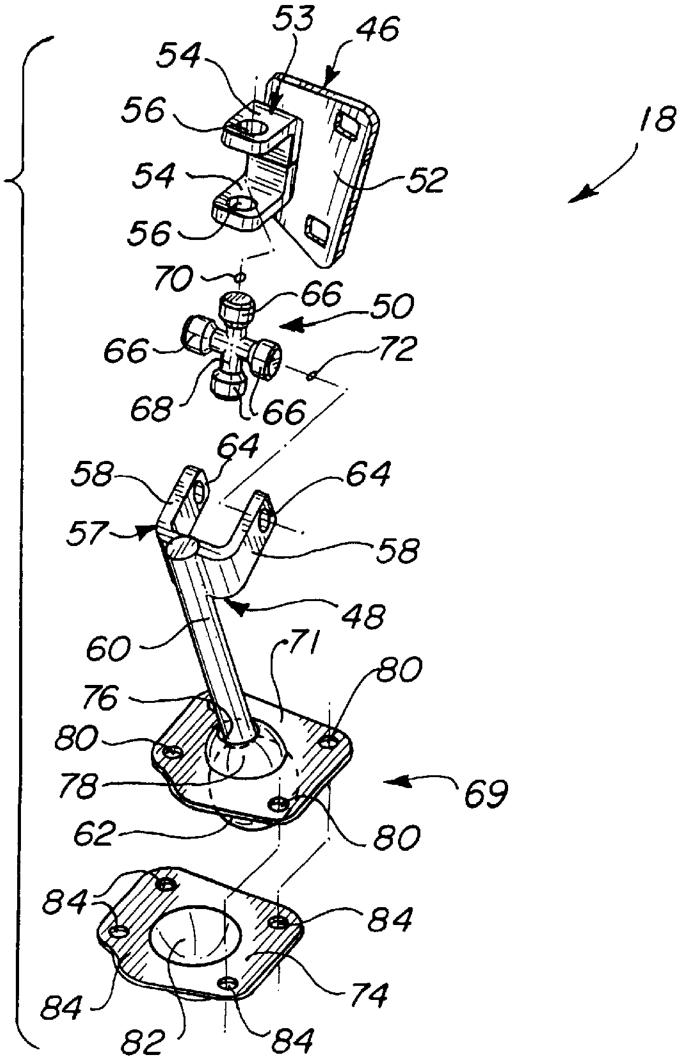
FIG. 3 is an exploded view of the lower hinge portion of the hinge assembly of the first preferred embodiment of the present invention.
Figure 3A:
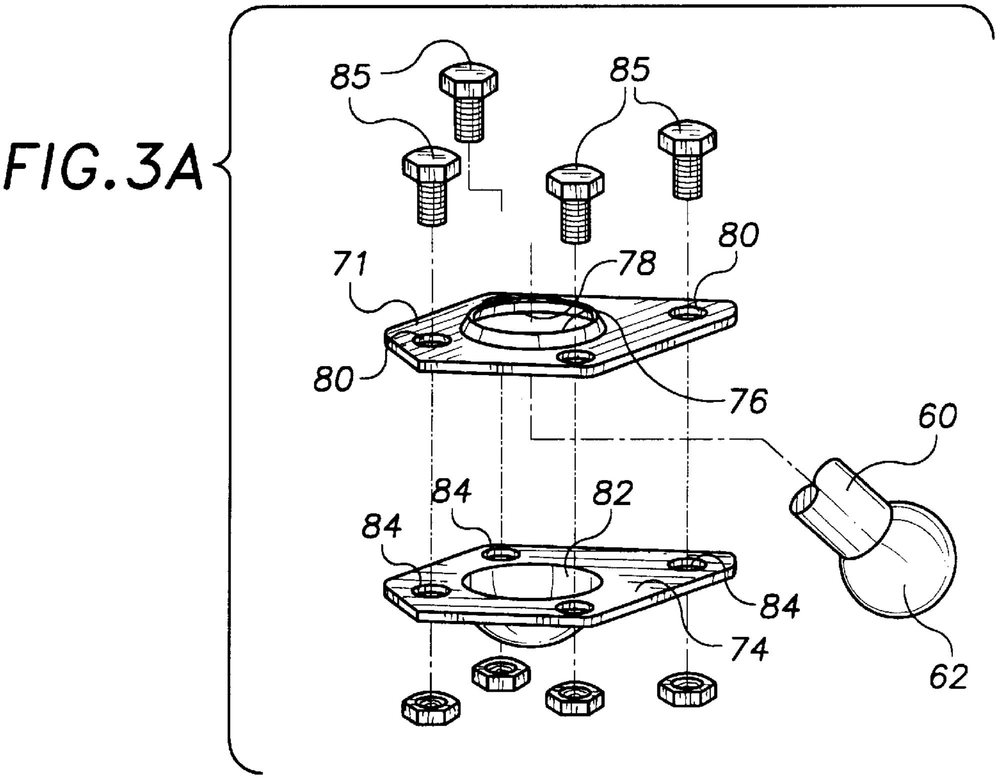
FIG. 3A is an exploded view of the lower joint of the first preferred embodiment of the present invention.

With particular reference to FIGS. 3 and 3A, lower hinge 18 defines a universal joint including a first portion 46, a second portion 48, a connection member 50 and lower joint assemble 69. Described hereinafter in greater detail, connection member 50 couples first portion 46 to second portion 48, while lower joint assembly 69 in turn couples second body clasp 48 to body 14. Specifically, first portion 46 includes a substantially planar mounting plate 52 and a first hinge element 53 welded or otherwise suitably attached thereto. The first hinge element 53 is generally C-shaped and includes a pair of generally parallel legs 54. Each of legs 54 includes a bearing aperture 56 for the receipt of connection member 50. Second portion 48 includes a generally cylindrical rod 60 having a first end terminating at a spherically shaped ball 62 and a second end including terminating at a second hinge element 57 having a pair of generally parallel legs 58. Each of legs 58 includes a bearing aperture 64 positioned in axial alignment with the other.

Mounting plate 52 of first portion 46 is coupled to door 12 in a manner known in the art such as bolting or riveting. In addition, connection member 50 rotatably couples first hinge element 53 to second hinge element 57. Connection member 50 includes a cross-shaped portion 68 defining a pair of orthogonal axes 70 and 72. Bearing caps 66 are positioned over cross-shaped 68 in alignment with one of axes 70 or 72 and needle bearings (not shown). One skilled in the art will appreciate that once first hinge element 53 is coupled to second hinge element 57 via connection member 50, connection member 50 functions in similar fashion to connection member 26. In particular, first portion 46 is free to rotate about axis 70 and second portion 48 is free to rotate about axis 72.

As described earlier, second hinge element 57 is interconnected to body 14 through ball and socket joint 69. Ball and socket joint 69 includes ball 62, a top plate 71 and a bottom plate 74. Top plate 71 is generally planar in shape including a rod receiving aperture 76, a top socket 78 and a plurality of mounting apertures 80. Top socket 78 is spherically shaped in a manner to complement the outer surface of ball 62. In a similar fashion, bottom plate 74 is generally planar in shape including a plurality of mounting apertures 84 and spherically shaped bottom socket 82 to complement the outer surface of ball 62. One skilled in the art will appreciate that bottom plate 74 may be integrally formed with body 14 and not deviate from the scope of invention presented herein. To complete the coupling of second portion 48 to body 14, fasteners 85 are utilized to couple top plate 71 and bottom plate 74 to body 14. One skilled in the art will further appreciate that upon assembly of ball and socket joint 69, the universal joint defined thereby is free to travel in a radial direction about the center of ball 62 but is unable to translate linearly in any direction. In other words, travel of the universal joint of lower hinge 18 is restricted to an arcuate path.

Figure 4:
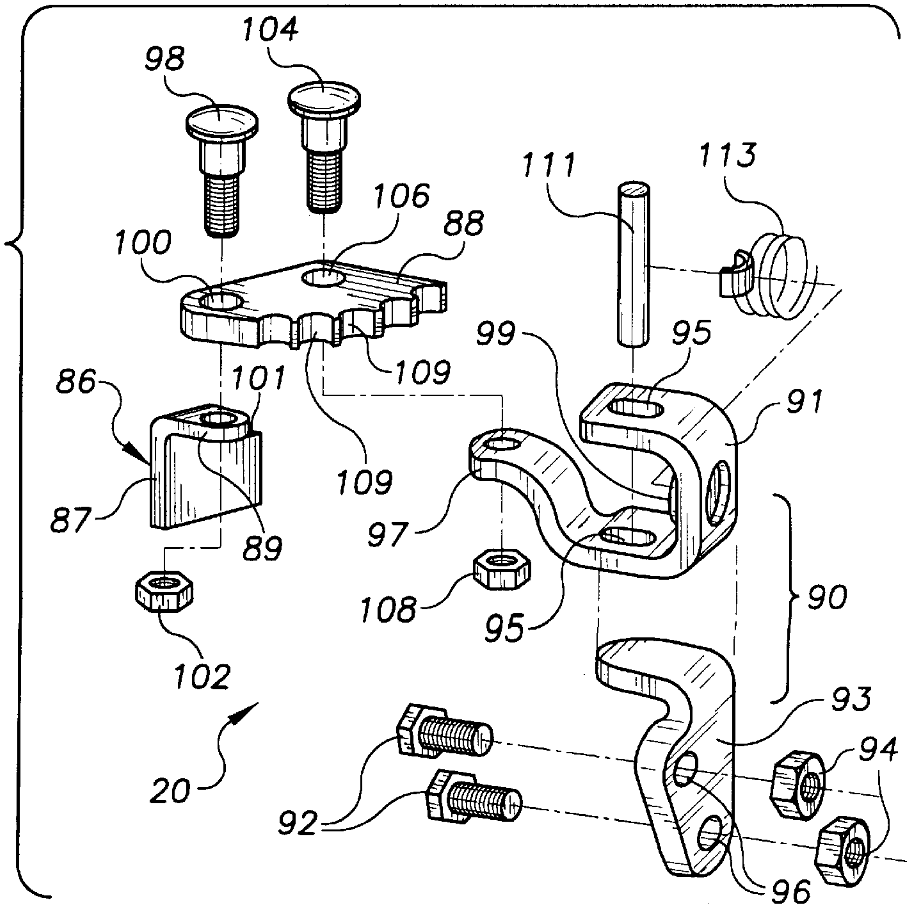
FIG. 4 is an exploded view of the control link portion of the hinge assembly of the first preferred embodiment of the present invention.

Referring particularly to FIG. 4, control linkage 20 will be detailed. Control linkage 20 is illustrated to generally include a control link 88 pivotally interconnecting a door bracket 86 and a check strap 90. Control link 88 includes a pair of axially spaced apart pivot apertures 100 and 106 and a plurality of detents 109 for receiving a stop pin 111. Control linkage 20 couples door 12 to body 14 and operates to define an arcuate travel path 115 (shown in FIG. 7) for the connection member 50 to follow. In order to limit the relative degrees of freedom between door 12 and body 14, check strap 90 is fixed to body 14 using threaded fasteners 92 and nuts 94 in cooperation with mounting apertures 96 of check strap 90. Check strap 90 is constructed from a C-shaped retainer 91 and a mounting bracket 93 coupled using a process such as welding. Retainer 91 includes a pair of axially aligned slots 95, a fastener aperture 97 and a spring detent 99 for positioning a spring 113 in relation thereto.

Door bracket 86 includes a body 87 and a laterally extending finger 89 having a pivot aperture 101 positioned therein. Door bracket 86 is coupled to door 12 using standard fastening techniques such as welding, riveting or bolting. As earlier mentioned, door bracket 86 and check strap 90 are pivotally interconnected by control link 88. Pivot pin 98 is disposed within pivot apertures 100 and 101 and fixed to door bracket 86 using nut 102. A running clearance exists between pivot pin 98 and pivot aperture 100 such that control link 88 is free to rotate about pivot pin 98. In similar fashion, pivot pin 104 is disposed within pivot aperture 106 rotatably coupling control link 88 to check strap 90. Pivot pin 104 is secured to check strap 90 by nut 108.

Control linkage 20 provides an additional operating feature other than limiting the articulation path of connection member 50. As shown in FIGS. 1 and 4, stop pin 111 is disposed within slots 95 and is biasedly engaged with control link 88 by spring 113. As door 12 is opened, control link 88 rotates relative to check strap 90, thereby forcing stop pin 111 to translate within slots 95. Because stop pin 111 is biasedly engaged with control link 88, door 12 tends to rest at positions corresponding to a least force or maximum extension position of spring 113. Accordingly, door 12 may be positively located in a number of positions corresponding to detents 109.

Figure 5:
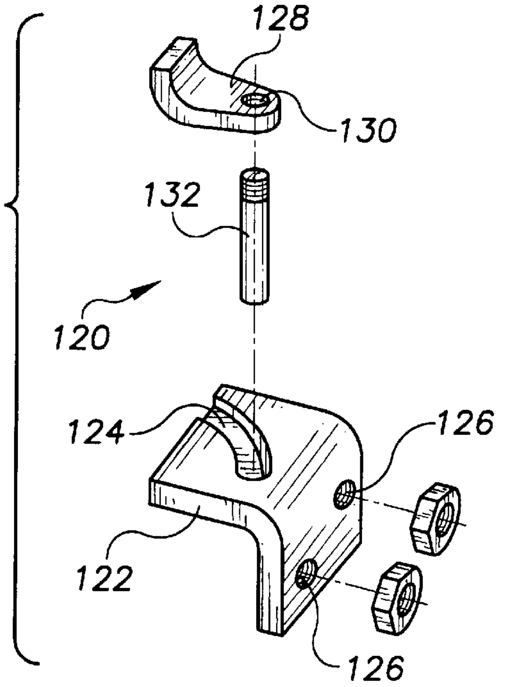
FIG. 5 is an exploded view of the guide assembly of the first preferred embodiment of the present invention.

As particularly shown in FIGS. 1 and 5, guide mechanism 120 provides an additional restraint on the movement of door 12 relative to body 14. Guide mechanism 120 includes an elongated L-shaped guide bracket 122 having an arcuate guide slot 124 for limiting the travel path of door 12 and a pair of mounting apertures 126 used to couple guide bracket 122 to body 14. Guide mechanism 120 further includes a support 128 coupled to door 12 and extending laterally therefrom. Support 128 includes an aperture 130 for receipt of a guide post 132. Guide post 132 is a generally cylindrical member having one end coupled to support 128 and disposed in aperture 130 and an opposite end disposed in guide slot 124. Accordingly, relative motion between door 12 and body 14 is limited by the position of guide post 132 within guide slot 124.

Figure 6:
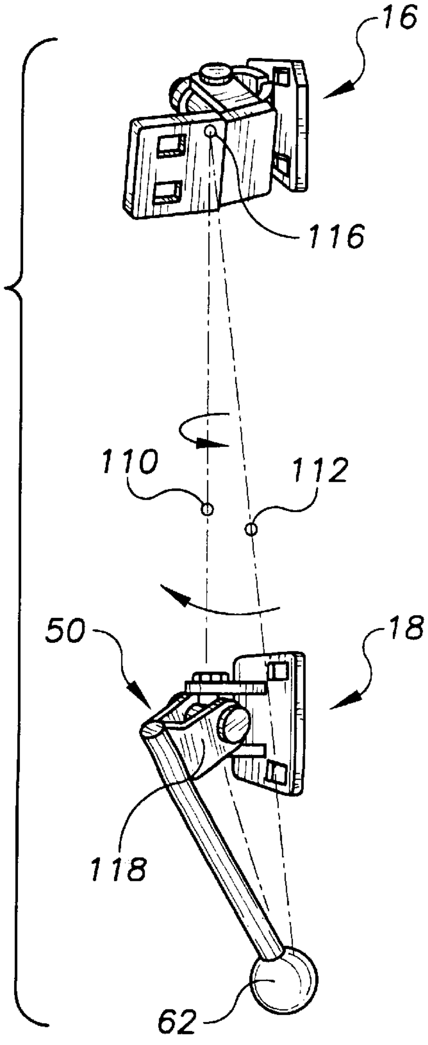
FIG. 6 is a simplified view of the hinge assembly of the first preferred embodiment of the present invention illustrating its swing dynamics.

FIG. 6 depicts the interrelation of upper hinge 16 and lower hinge 18 of the first preferred embodiment of the present invention. A door axis of rotation 110 is constructed by striking a line from a center 116 of upper hinge 16 to a center 118 of connection member 50. As door 12 is articulated about door axis of rotation 110, center 118 of middle joint 50 rotates about a hinge axis of rotation 112. Hinge axis of rotation 112 is defined by a line containing center 116 of upper hinge 16 and the center of ball 62.

Figure 7:
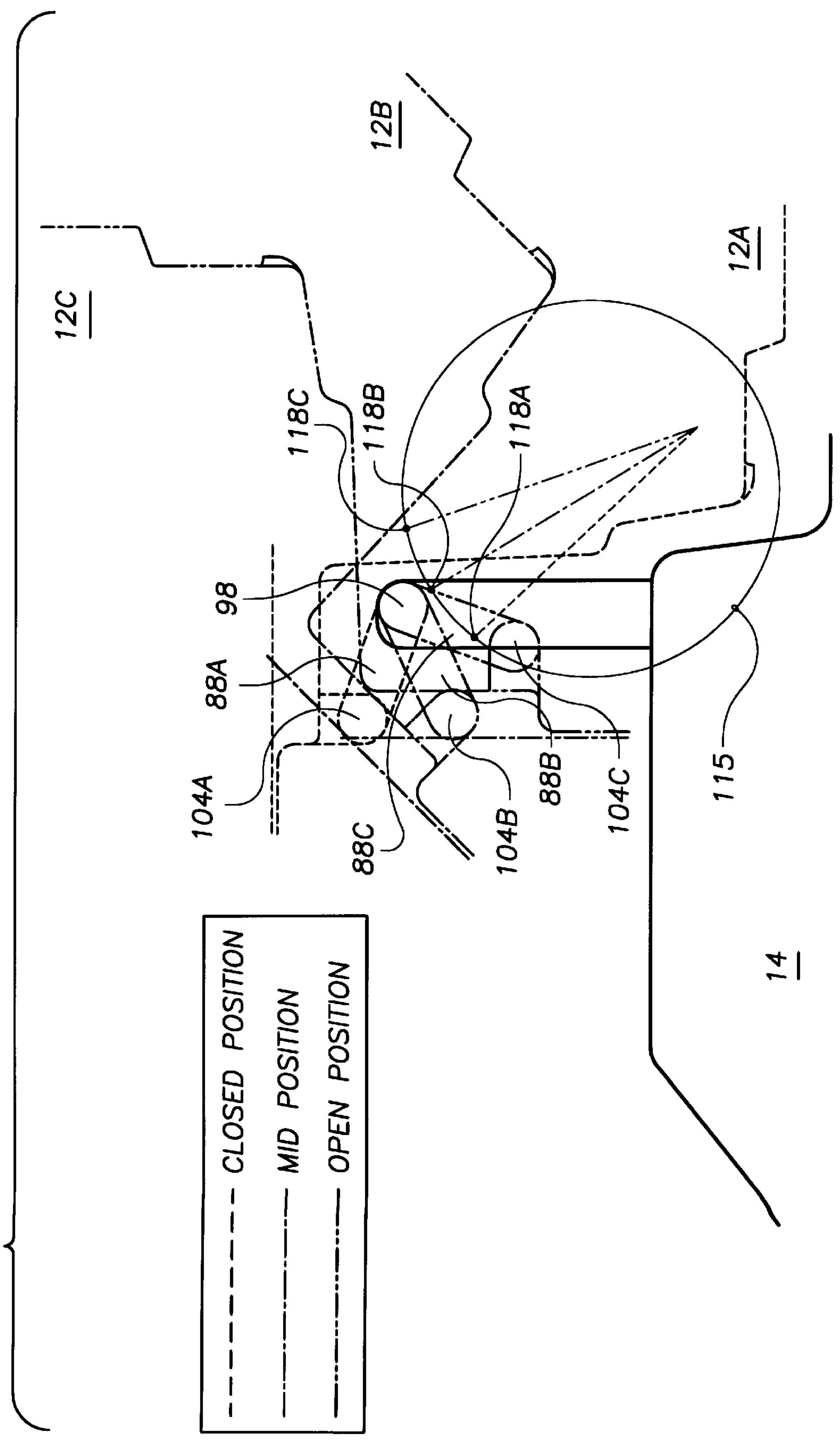
FIG. 7 is a schematic representation of the kinematic relationship between the control link, the middle joint and the door of the first preferred embodiment of the present invention.

As best seen in FIG. 7, middle joint center 118 follows path 115 throughout door articulation. Points 118A, 118B and 118C correspond to fully closed, half open and fully open positions of door 12, respectively. As shown in FIGS. 1 and 7, one skilled in the art will appreciate that the spatial positioning of pivot pin 98, pivot pin 104, and upper hinge 16 sets up a geometrical relationship defining arcuate path 115 that connection member 50 will follow. Specifically, FIG. 7 includes points 104A, 104B and 104C depicting the location of pivot pin is 104 at each of the aforementioned door positions.

Referring to FIGS. 6 and 7 and based on the aforementioned geometry, a conically shaped path exists which door axis of rotation 110 follows. The conically shaped path is defined by a vertex positioned at center 116 and another point along arcuate path 115 which center 118 follows as door 12 is opened. The conically shaped path contains each of the instantaneous positions of door axis of rotation 110 created as door 14 is articulated from a fully closed to a fully open position. With specific reference to FIG. 7, and beginning at a fully closed door position 12A, control link 88 begins at location 88A with the pivot pin 104 at location 104A. Center 118 of connection member 50 begins at location 118A closest to the longitudinal center line of the vehicle (not shown). To further illustrate the operation of conical hinge assembly 10, middle and fully open door positions are depicted at 12B and 12C respectively. When door 12 is at position 12B, the control link articulates to location 88B and pivot pin 104 is positioned at 104B. During the period of door opening from location 12A to location 12B, center 118 of connection member 50 travels from location 118A to location 118B along arcuate path 115. In similar fashion, the control link 88, the pivot pin 104 and the connection member center 118 are positioned at 88C, 104C, and 118C respectively when door 12 is fully opened at 12C. As illustrated by points 118B and 118C, connection member 50 moves away from the longitudinal center line of the vehicle as door 12 is opened. As best shown in FIGS. 6 and 7, the door axis of rotation 110 follows a conically shaped path as door 12 is articulated.

Objects of the invention may now be realized. Specifically, as door 12 is opened, forward edge 114 (FIG. 1) travels away from body 14 as door axis of rotation 110 follows the conically shaped path. Accordingly, the resultant amount of intrusion of forward edge 114 toward the vehicle center line is substantially reduced.

Figure 8:
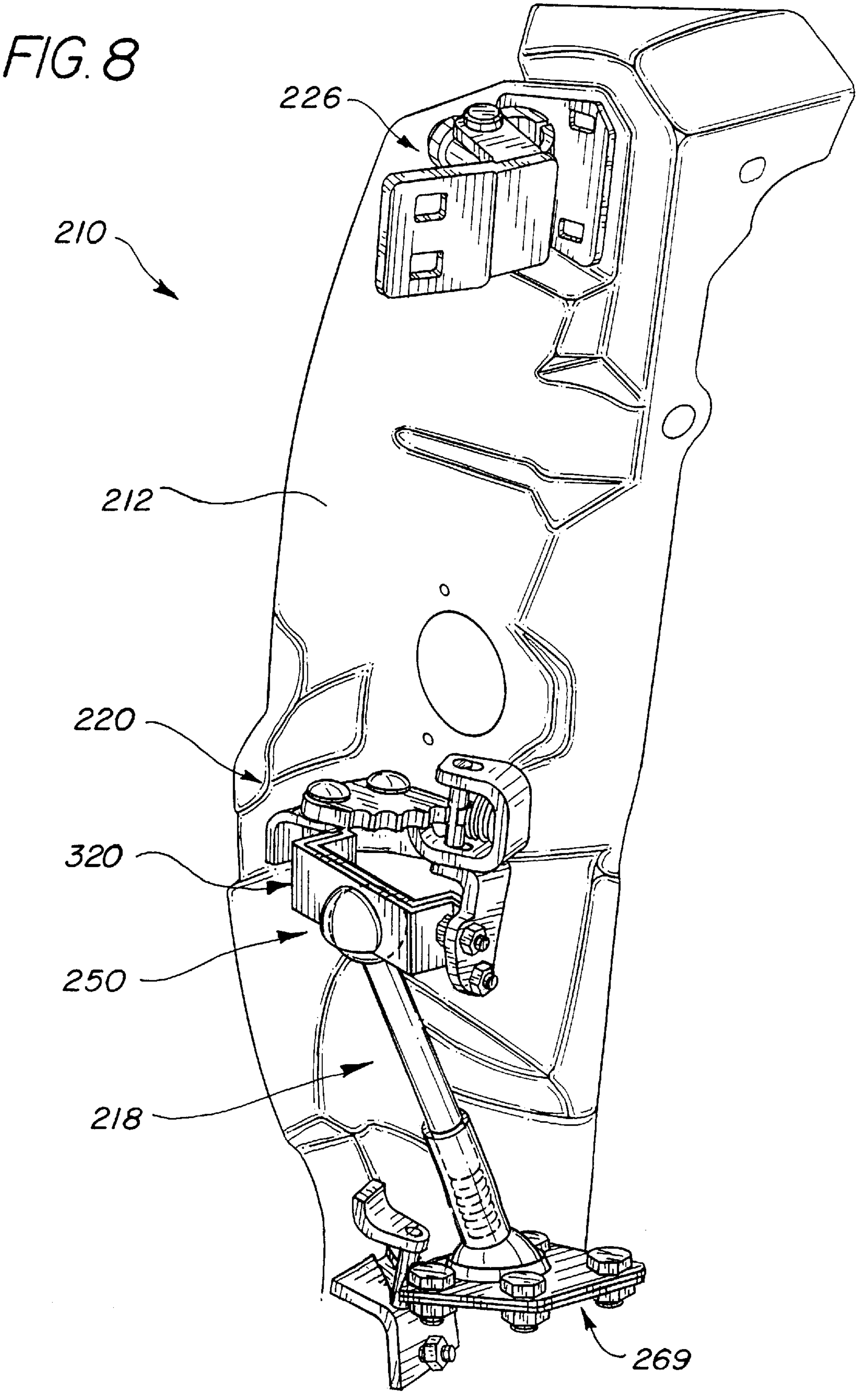
FIG. 8 is a perspective view of the control link and the middle joint constructed in accordance with the teachings of the second preferred embodiment of the present invention, the hinge assembly shown operatively associated with a door and body of a motor vehicle.
Figure 9:
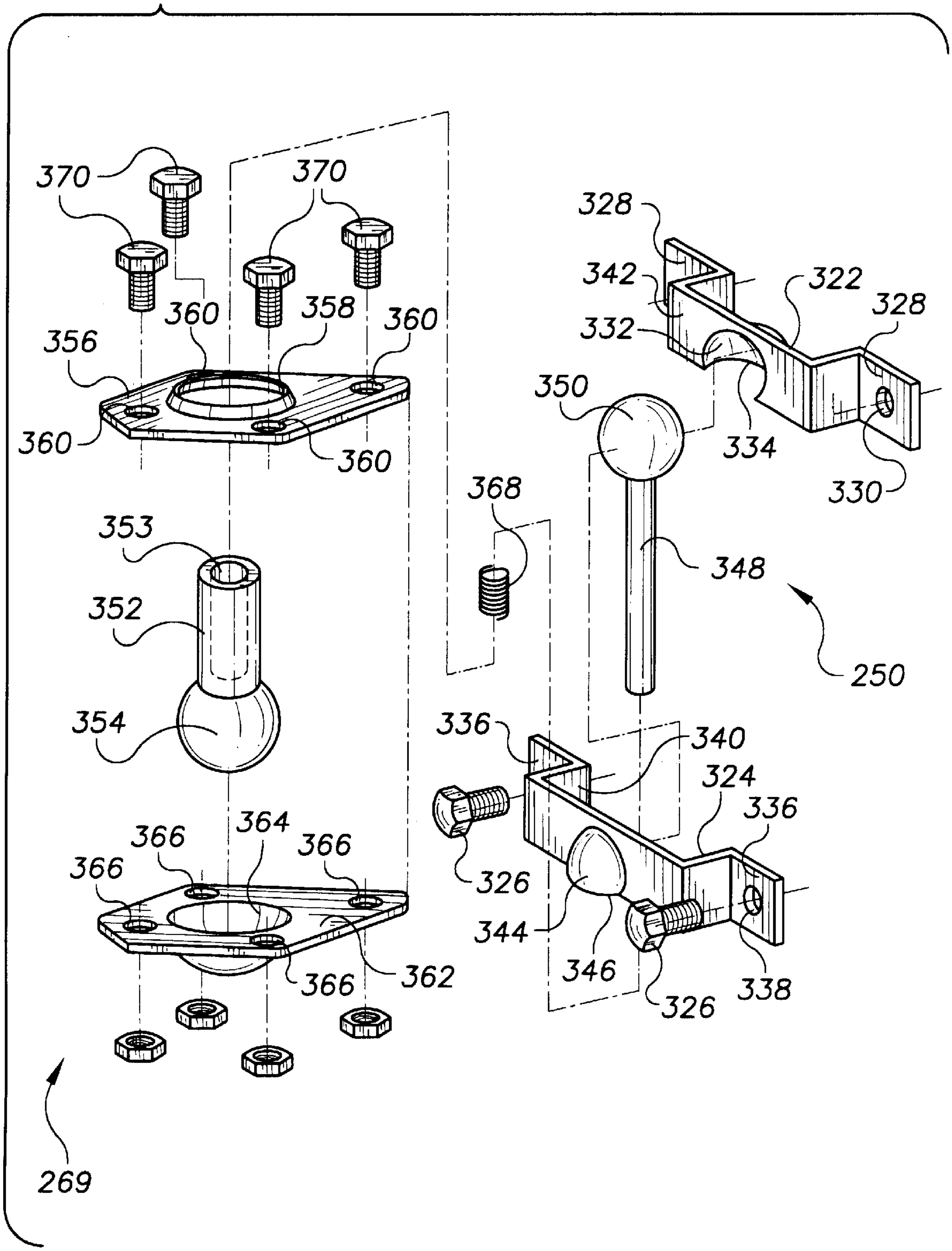
FIG. 9 is an exploded view of the lower hinge portion of the hinge assembly of the second preferred embodiment of the present invention.
Figure 10:
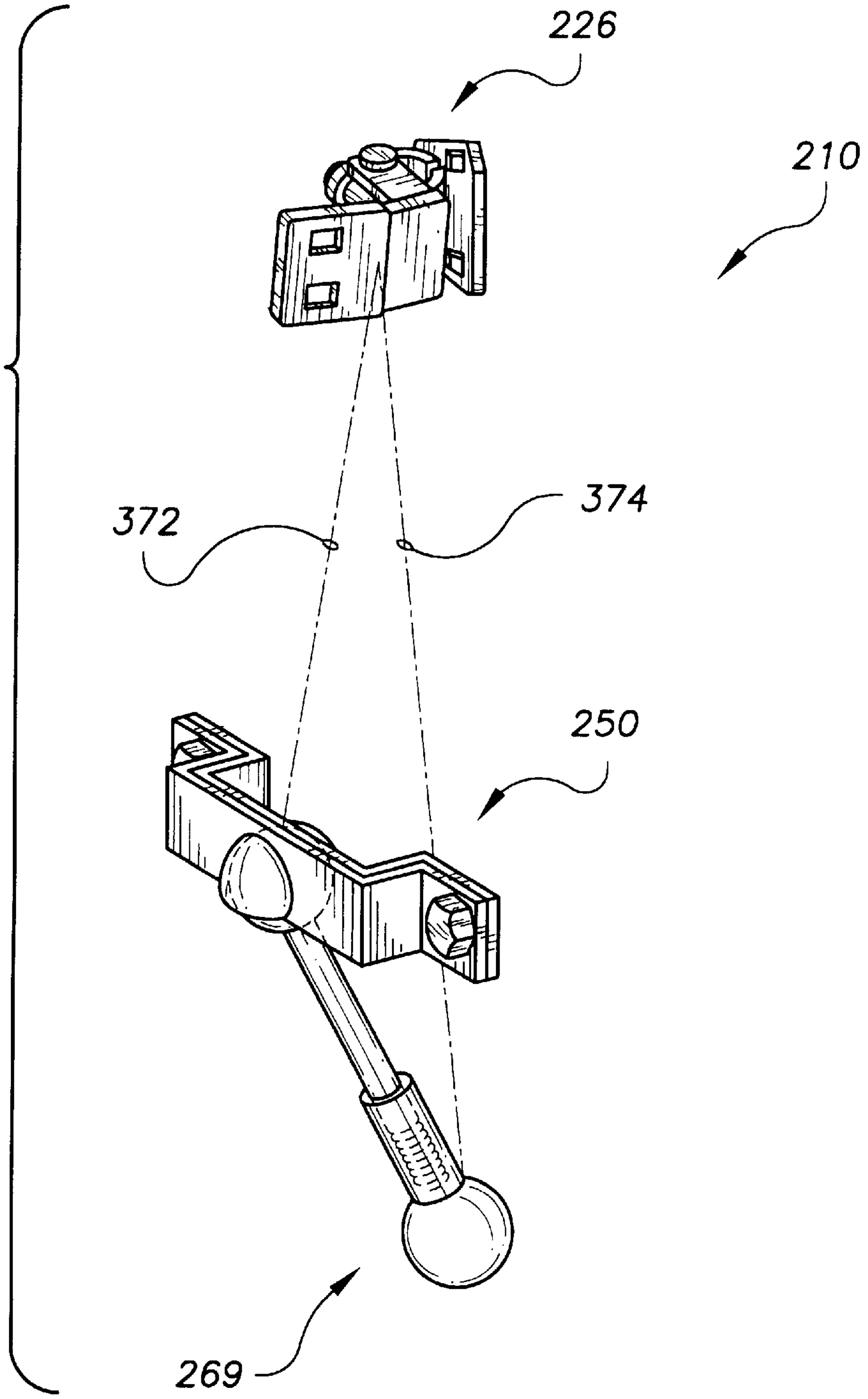
FIG. 10 is a simplified view of the hinge assembly of the second preferred embodiment of the present invention illustrating its swing dynamics.

A second preferred embodiment of the present invention is shown in FIGS. 8–10. The function of the components of this embodiment are essentially the same as those previously described in FIGS. 1–7. Accordingly, those skilled in the art will appreciate that door hinge assembly 210 provides the advantages previously discussed herein. The second embodiment of door hinge assembly 210 differs from the first embodiment in details of the lower hinge construction only. As shown in FIG. 8, lower hinge 218 includes a middle joint 250 and a lower joint 269. Each of joints 250 and 269 are ball and socket type joints telescopically interconnected as described in greater detail hereinafter. Middle joint 250 is rotatably coupled to door 212 via clamp assembly 320.

As shown in FIG. 9, clamp assembly 320 includes inner clamp half 322, outer clamp half 324, and fasteners 326. Inner clamp half 322 is a generally channel-shaped member including laterally extending mounting flanges 328 on each end. Each of flanges 328 includes a fastener aperture 330 used in conjunction with fasteners 326 to couple clamp assembly 320 to door 212. Inner clamp half 322 further includes a partially spherically shaped socket 332 terminating at end wall 334. Outer clamp half 324 is also channel shaped having laterally extending flanges 336 and fastener apertures 338. The laterally extending flanges 336 of outer clamp half 324 are spaced apart such that an inner surface 340 of outer clamp half 324 substantially conforms to an outer surface 342 of inner clamp 322. In addition, outer clamp half 324 includes a partially spherically shaped socket 344 terminating at end wall 346.

Joint 250 further includes telescoping rod 348 having a spherically shaped ball 350 at a terminal end thereof. One skilled in the art will appreciate that once outer clamp half 324 is coupled to inner clamp half 322 with telescoping rod 348 positioned therebetween, ball 350 cooperates with socket 332 and socket 344 to create articulatable middle joint 250.

Lower joint 269 includes hollow rod 352 having a spherically shaped ball 354 at a terminal end thereof. In similar fashion to lower ball and socket joint 69 of the first embodiment, lower ball and socket joint 269 includes a top plate 356 having a socket 358 and fastener apertures 360, and a lower plate 362 having a socket 364 and fastener apertures 366. At assembly, telescoping rod 348, along with rod spring 368, are disposed within receptacle 353 of hollow rod 352. To complete the interconnection of door 212 with body 214, lower joint 269 is coupled to body 214 via fasteners 370. One skilled in the art will appreciate that telescoping rod 348 is free to translate within receptacle 353, thereby providing a mechanism to compensate for manufacturing tolerances related to the construction of door 212 and body 214. In addition, rod spring 368 biasedly engages ball 350 with clamp assembly 320 to provide a force input to door 212 assisting the operator of the vehicle when opening the door.

As shown in FIGS. 8 and 10, the conical hinge function of hinge assembly 10 is mimicked in hinge assembly 210. Specifically, the center of middle joint 250 follows an arcuate path defined by the locations of upper joint 226, upper joint 250, lower joint 269, and control linkage 220. Accordingly, door axis of rotation 372 follows a conical path about hinge axis of rotation 374.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A hinge assembly for a motor vehicle having a body and a frame, the hinge assembly comprising:

an upper joint pivotally interconnecting a door to said body;

a middle joint pivotally interconnecting said door to a rod, said upper and middle joints defining a door axis of rotation; and a lower joint pivotally interconnecting said body to said rod.

2. The hinge assembly for a motor vehicle of claim 1 further including a guide mechanism for limiting the movement of said door relative to said body, said guide mechanism including a guide bracket having an arcuate guide slot, a support coupled to said door, and a guide post having a first end coupled to said support and a second end disposed in said guide slot.

3. The hinge assembly for a motor vehicle of claim 1 wherein said upper and middle joints are universal joints and said lower joint is a ball and socket joint.

4. The hinge assembly for a motor vehicle of claim 1 further including a control linkage having a check strap coupled to said body, a door bracket coupled to said door, and a control link pivotally interconnecting said door bracket to said check strap.

5. The hinge assembly for a motor vehicle of claim 1 wherein said control linkage includes a control link having a plurality of detents cammingly engaged with a spring biased stop pin to provide a plurality of positions for positively locating said door relative to said body as said door is articulated.

6. The hinge assembly for a motor vehicle of claim 1 wherein said lower joint and said middle joint are ball and socket type joints.

7. The hinge assembly for a motor vehicle of claim 6 wherein said lower joint and said middle joint are interconnected by a telescoping rod.

8. A hinge assembly for a motor vehicle having a body and a door, the hinge assembly comprising:

an upper hinge having a first door clasp coupled to said door and a first body clasp coupled to said body, said first door clasp and said first body clasp pivotally interconnected by an upper joint;

a lower hinge having a middle joint and a lower joint, said middle joint rotatably coupling a second door clasp to a second body clasp, said lower joint rotatably coupling said second body clasp to said body; and a control linkage pivotally interconnecting said door and said body, said control linkage defining an arcuate path for said middle joint to follow as said door is rotated.

9. The hinge assembly for a motor vehicle of claim 8 wherein said control linkage includes a door bracket, a control link, and a check strap, said check strap is coupled to said body and said door bracket is coupled to said door, said control link having a first end pivotally connected to said door bracket and a second end pivotally connected to said check strap.

10. The hinge assembly for a motor vehicle of claim 8 wherein a center of said upper joint and a center of said middle joint define an axis of door rotation and further wherein said second body clasp, said control link and said check strap define a circular path for said center of said middle joint to follow thereby creating a conically shaped path for said axis of door rotation to follow as said door is opened.

11. The hinge assembly for a motor vehicle of claim 8 wherein said second body clasp includes a rod having a pair of legs protruding from said rod positioned to cooperate with said middle joint, said second body clasp further including a spherically shaped ball positioned to cooperate with said lower joint.

12. The hinge assembly for a motor vehicle of claim 8 wherein said upper and middle joint are universal joints.

13. The hinge assembly for a motor vehicle of claim 8 wherein said middle and lower joints are ball and socket type joints.

14. The hinge assembly for a motor vehicle of claim 8 further including a guide pin coupled to said door and a guide bracket having a slot, said guide bracket coupled to said body, said guide pin disposed within said slot to further restrict movement of said door relative to said body.

15. The hinge assembly for a motor vehicle of claim 10 wherein said center of said middle joint is positioned at a point closer to a longitudinal center line of said vehicle when said door is in a closed position than when said door is in an open position.

16. A motor vehicle comprising:

a body;

a door; and a hinge assembly pivotally interconnecting said body and said door, said hinge assembly including:

an upper joint pivotally interconnecting a first door clasp and a first body clasp, said first body clasp coupled to said body and said first door clasp coupled to said door;

a middle joint pivotally interconnecting a second door clasp and a second body clasp, said second door clasp is coupled to said door;

a lower joint pivotally interconnecting said second body clasp and said body; and a control linkage pivotally interconnecting said body and said door thereby limiting the relative motion between said body and said door.

17. The motor vehicle of claim 16 wherein said middle joint travels about an arcuate path as said door is articulated.

18. The motor vehicle of claim 17 wherein said arcuate path is defined by a spatial relation between said upper joint and said control linkage.

19. The motor vehicle of claim 18 wherein said control linkage includes a door bracket, a control link and a check strap, said door bracket coupled to said door and said check strap coupled to said body, said control link pivotally interconnecting said door bracket and said check strap such that said control link may pivot on each of said door bracket and said check strap.

20. The motor vehicle of claim 16 wherein said middle joint is a ball and socket joint.

21. A hinge assembly for a motor vehicle having a body, the hinge assembly comprising:

an upper joint pivotally interconnecting a door to said body;

a middle joint spaced apart from said upper joint a first predetermined distance, said middle joint interconnecting said door to a lower joint;

said lower joint spaced apart from said middle joint a second predetermined distance and spaced apart from said upper joint a third predetermined distance, said lower joint pivotally interconnecting said body and said middle joint;

each of said joints positioned such that said third predetermined distance is less than a sum of said first predetermined and second predetermined distances.

22. The hinge assembly for a motor vehicle of claim 21 further including a guide mechanism for limiting the movement of said door relative to said body, said guide mechanism including a guide bracket having an arcuate guide slot, a support coupled to said door, and a guide post having a first end coupled to said support and a second end disposed in said guide slot.

23. The hinge assembly for a motor vehicle of claim 21 wherein said upper and middle joints are universal joints and said lower joint is a ball and socket joint.

24. The hinge assembly for a motor vehicle of claim 21 further including control linkage having a check strap coupled to said body, a door bracket coupled to said door, and a control link pivotally interconnecting said door bracket to said check strap.

25. The hinge assembly for a motor vehicle of claim 21 wherein said control linkage includes a control link having a plurality of detents cammingly engaged with a spring biased stop pin to provide a plurality of positions for positively locating said door relative to said body as said door is articulated.

26. The hinge assembly for a motor vehicle of claim 21 wherein said lower joint and said middle joint are ball and socket type joints.

27. The hinge assembly for a motor vehicle of claim 26 wherein said lower joint and said middle joint are interconnected by a telescoping rod.

* * * * *